United States Patent
Tang et al.

(10) Patent No.: US 10,157,331 B1
(45) Date of Patent: Dec. 18, 2018

(54) SYSTEMS AND METHODS FOR IMAGE PREPROCESSING TO IMPROVE ACCURACY OF OBJECT RECOGNITION

(71) Applicant: CAPITAL ONE SERVICES, LLC, McLean, VA (US)

(72) Inventors: Qiaochu Tang, The Colony, TX (US); Sunil Subrahmanyam Vasisht, Flowermound, TX (US); Stephen Michael Wylie, Carrollton, TX (US); Geoffrey Dagley, McKinney, TX (US); Micah Price, Plano, TX (US); Jason Richard Hoover, Grapevine, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 15/915,583

(22) Filed: Mar. 8, 2018

(51) Int. Cl.
  *G06K 9/62* (2006.01)
  *G06K 9/32* (2006.01)
  *G06K 9/20* (2006.01)

(52) U.S. Cl.
  CPC ......... *G06K 9/6231* (2013.01); *G06K 9/2054* (2013.01); *G06K 9/3233* (2013.01); *G06K 9/6282* (2013.01)

(58) Field of Classification Search
  CPC .. G06K 9/6231; G06K 9/3233; G06K 9/2054; G06K 9/6282
  See application file for complete search history.

(56) References Cited

U.S. PATENT DOCUMENTS

| | | | |
|---|---|---|---|
| 2015/0170002 A1* | 6/2015 | Szegedy | G06K 9/66 382/156 |
| 2017/0147905 A1* | 5/2017 | Huang | G06K 9/6232 |
| 2017/0169313 A1* | 6/2017 | Choi | G06K 9/6267 |
| 2018/0032840 A1* | 2/2018 | Yu | G06K 9/6256 |
| 2018/0108137 A1* | 4/2018 | Price | G06T 7/0081 |

OTHER PUBLICATIONS

Joseph Redmon et al., "You Only Look Once: Unified, Real-Time Object Detection," *2016 IEEE Conference on Computer Vision and Pattern Recognition* (2016), pp. 779-788.
Wei Liu et al., "SSD: Single Shot MultiBox Detector," *Computer Vision—ECCV 2016* (2016), pp. 21-37.

* cited by examiner

*Primary Examiner* — Phuoc Tran
(74) *Attorney, Agent, or Firm* — Finnegan, Henderson, Farabow, Garrett & Dunner LLP

(57) ABSTRACT

The present disclosure relates to image preprocessing to improve object recognition. In one implementation, a system for preprocessing an image for object recognition may include at least one memory storing instructions and at least one processor configured to execute the instructions to perform operations. The operations may include receiving the image, detecting a plurality of bounding boxes within the image, grouping the plurality of bounding boxes into a plurality of groups such that bounding boxes within a group have shared areas exceeding an area threshold, deriving a first subset of the plurality of bounding boxes by selecting bounding boxes having highest class confidence scores from at least one group, selecting a bounding box from the first subset having a highest score based on area and class confidence score, and outputting the selected bounding box.

20 Claims, 8 Drawing Sheets

SYSTEMS AND METHODS FOR IMAGE PREPROCESSING TO IMPROVE ACCURACY OF OBJECT RECOGNITION

TECHNICAL FIELD

This disclosure relates generally to the field of image processing. More specifically, and without limitation, this disclosure relates to systems and methods for improving object recognition by preprocessing an image.

BACKGROUND

Extant image recognition algorithms, such as classifiers, cascading classifiers, neural networks, convolutional neural networks, or the like achieve high accuracy (e.g., comparable to humans) when images contain a single object that is large and centered. However, the accuracy of extant algorithms is decreased when multiple objects are present within the image. This is due, in part, to conflicting classifications when different objects (such as a vehicle and a person, a kitten and a ball, or the like) are present within the image. This is also due, in part, to interference between features extracted from the multiple objects within the same image.

One extant solution for object recognition is the use of bounding box algorithms. Such algorithms, which often comprise neural networks or convolutional neural networks, may detect a plurality of objects within an image and assign one or more possible boxes to the detected objects, the boxes defining areas of the image corresponding to the detected objects. However, such algorithms usually generate many (e.g., on the order of 1000 or more) bounding boxes. Extant techniques, such as non-maximum pooling, allow for reducing the number of bounding boxes. However, such techniques often do not account for false positives. Moreover, such techniques often do not allow for the selection of one or more classes of interest and/or regions of interest within the image.

Moreover, extant bounding box algorithms usually only classify objects enclosed by bounding boxes into one of a limited number of classes, such as "person," "vehicle," "sign," or the like. More detailed object recognition (such as identifying a make and model of a detected vehicle or identifying an architectural style of a detected building or other fine-grained classification problems) often requires additional processing. For example, additional convolutional neural networks that recognize objects based on feature analysis may be used. However, such recognition is particularly error prone when a plurality of possible objects is included in the same image. Moreover, such recognition is costly and, therefore, cannot effectively be performed on the large number of possible bounding boxes detected within the image.

SUMMARY

Disclosed are systems and methods for preprocessing an image for object recognition. Accordingly, disclosed systems and methods result in improved accuracy if images having a plurality of objects are fed into an object recognition algorithm. Moreover, disclosed systems and methods may allow for seamless fine-tuning of object recognition to regions centered on one or more pixels. In addition, disclosed systems and methods may allow for seamless fine-tuning of object recognition to one or more selected classes of objects. Accordingly, disclosed systems and methods use technical solutions to solve problems regarding the accuracy and adjustability of object recognition algorithms.

There are many possible applications for such capabilities. Examples of applications include identification one or more objects of interest in a crowded image, e.g., a vehicle of interest on a busy street or in a parking lot, a person of interest on a busy sidewalk or in a crowd, or the like. Additional examples of applications may include cropping of an image in order to improve classifications and indexing, e.g., to reduce noise on one or more edges of the image, to divide an image having multiple objects into a plurality of sub-images, or the like.

According to an exemplary embodiment of the present disclosure, a system for preprocessing an image for object recognition may comprise at least one memory storing instructions and at least one processor configured to execute the instructions to perform operations. The operations may comprise: receiving the image, detecting a plurality of bounding boxes within the image, grouping the plurality of bounding boxes into a plurality of groups such that bounding boxes within a group have shared areas exceeding an area threshold, deriving a first subset of the plurality of bounding boxes by selecting bounding boxes having highest class confidence scores from at least one group, selecting a bounding box from the first subset having a highest score based on area and class confidence score, and outputting the selected bounding box.

According to another embodiment of the present disclosure, a system for preprocessing an image for object recognition may comprise at least one memory storing instructions and at least one processor configured to execute the instructions to perform operations. The operations may comprise: receiving the image having dimensions, resizing the image to match input dimensions of a model, using the model, detecting a plurality of bounding boxes within the resized image, grouping the plurality of bounding boxes into a plurality of groups such that bounding boxes within a group have shared areas exceeding an area threshold, deriving a first subset of the plurality of bounding boxes by selecting bounding boxes having highest class confidence scores from at least one group, selecting a bounding box from the first subset having a highest score based on area and class confidence score, scaling the selected bounding box based on the dimensions of the received image and the input dimensions, and outputting the scaled bounding box.

According to an exemplary embodiment of the present disclosure, a system for preprocessing an image for object recognition may comprise at least one memory storing instructions and at least one processor configured to execute the instructions to perform operations. The operations may comprise: receiving the image having dimensions, resizing the image to match input dimensions of a model, using the model, detecting a plurality of bounding boxes within the resized image, deriving a first subset of the plurality of bounding boxes by eliminating bounding boxes having a highest class confidence score below a first class confidence score threshold, deriving a second subset of the first subset by eliminating bounding boxes having a highest class confidence score not within a selected class, grouping the bounding boxes of the second subset into a plurality of groups such that bounding boxes within a group have shared areas exceeding an area threshold, deriving a third subset of the grouped bounding boxes by selecting a bounding box having a highest class confidence score from at least one group, paring the third subset by eliminating bounding boxes that do not include a center point of the image, selecting a bounding box from the pared third subset such that the selected bounding box has a highest score based on area and class confidence score, scaling the selected bounding box based on the dimensions of the received image and the input dimensions, and outputting the scaled bounding box.

According to another embodiment of the present disclosure, a system for performing object recognition on an image may comprise at least one memory storing instructions and at least one processor configured to execute the instructions to perform operations. The operations may comprise: receiving the image; using a first neural network, generating a matrix defining a plurality of bounding boxes within the image, the bounding boxes having associated areas and associated class confidence scores; paring the matrix by using non-maximum suppression; ranking bounding boxes defined by the pared matrix by composite scores based on associated areas and highest associated class confidence scores; selecting at least one bounding box based on the ranking; generating at least one cropped image based on the at least one selected bounding box; and inputting the at least one cropped image to a second neural network to classify at least one object within the at least one selected bounding box.

According to an exemplary embodiment of the present disclosure, a system for performing object recognition on an image may comprise at least one memory storing instructions and at least one processor configured to execute the instructions to perform operations. The operations may comprise: receiving the image; using a first neural network, generating a matrix defining a plurality of bounding boxes within the image, the bounding boxes having associated areas and associated class confidence scores; paring the matrix by eliminating bounding boxes having highest associated confidence scores not within one or more selected classes; ranking bounding boxes defined by the pared matrix by composite scores based on associated areas and highest associated confidence scores; selecting at least one bounding box based on the ranking; generating at least one cropped image based on the at least one selected bounding box; and inputting the at least one cropped image to a second neural network to classify at least one object within the at least one selected bounding box.

According to another embodiment of the present disclosure, a system for performing object recognition on an image may comprise at least one memory storing instructions and at least one processor configured to execute the instructions to perform operations. The operations may comprise: receiving the image; using a first neural network, generating a matrix defining a plurality of bounding boxes within the image, the bounding boxes having associated areas, associated classes and associated confidence scores; paring the matrix by eliminating bounding boxes having highest associated confidence scores not within one or more selected classes; ranking bounding boxes defined by the pared matrix by composite scores based on associated areas and highest associated confidence scores; selecting at least one bounding box based on the ranking; generating at least one cropped image based on the at least one selected bounding box; inputting the at least one cropped image to a second neural network to generate features associated with the at least one selected bounding box; and inputting the generated features into a third neural network to classify at least one object within the at least one selected bounding box based on the associated features.

Additional embodiments of the present disclosure include non-transitory computer-readable media storing instructions that cause one or more processors to execute any of the methods disclosed herein.

Additional objects and advantages of the present disclosure will be set forth in part in the following detailed description, and in part will be understood by one of ordinary skill in the art based on the description, or may be learned by practice of the present disclosure. The objects and advantages of the present disclosure will be realized and attained by means of the elements and combinations particularly pointed out in the appended claims.

It is to be understood that the foregoing general description and the following detailed description are exemplary and explanatory only, and are not restrictive of the disclosed embodiments.

BRIEF DESCRIPTION OF THE DRAWINGS

The accompanying drawings, which comprise a part of this specification, illustrate several embodiments and, together with the description, serve to explain the disclosed principles. In the drawings.

DETAILED DESCRIPTION

Figure 1:
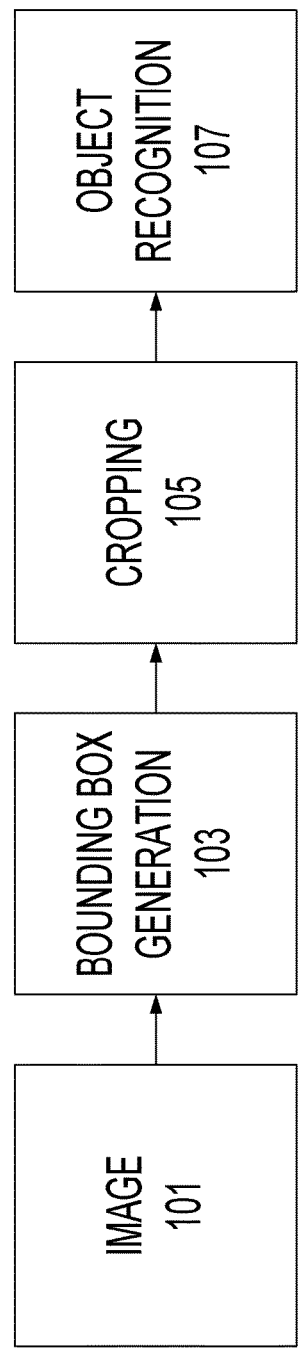
FIG. 1 is a schematic representation of an example pipeline for object recognition on a preprocessed image, consistent with embodiments of the present disclosure.

The disclosed embodiments relate to systems and methods for preprocessing an image for object recognition. Embodiments of the present disclosure may be implemented using at least one processor and at least one memory, as described below. In some embodiments, the at least one processor may comprise a microprocessor, such as a central processing unit (CPU), a graphics processing unit (GPU), or other electronic circuitry capable of carrying out the instructions of a computer program by performing the operations specified by the instructions. Alternatively or concurrently, the at least one processor may comprise one or more special-purpose devices built according to embodiments of the present disclosure using suitable circuit elements, e.g., one or more application-specific integrated circuits (ASICs), field-programmable gate arrays (FPGAs), or the like. In some embodiments, the at least one memory may comprise a volatile memory, such as random access memory (RAM), a non-volatile memory, such as a hard disk drive, a flash memory, or the like, or any combination thereof.

According to an aspect of the present disclosure, a system for preprocessing an image for object recognition may comprise at least one processor. The at least one processor may be configured to receive an image. As used herein, the term "image" refers to any digital representation of a scene formed by one or more light beams. The image may comprise a plurality of pixels, each pixel storing corresponding color and/or intensity data (e.g., RGB, CMYK, or grayscale data). The image may be stored in any appropriate format, such as bitmap (BMP) format, Joint Photographic Experts Group (JPEG) format, Graphics Interchange Format (GIF), Tagged Image File Format (TIFF), a raw format, or the like. The at least one processor may receive the image from a memory, e.g., via one or more buses, over a computer network, e.g., by using a network interface controller (NIC), from an image sensor, e.g., a charge-coupled device (CCD), a complementary metal-oxide-semiconductor (CMOS), an N-type metal-oxide-semiconductor logic (NMOS), or the like.

The at least one processor may be further configured to detect a plurality of bounding boxes within the received image. For example, the at least one processor may use a convolutional neural network to detect the plurality of bounding boxes. The convolutional neural network may comprise, for example, a You Only Look Once (YOLO) architecture, a Single-Shot Detector (SSD) architecture, or the like.

Additionally or alternatively, the at least one processor may be configured to detect a plurality of bounding polygons or other image segmentation within a received image. For ease of use, the term bounding box is used in this section, but one of ordinary skill in the art would understand how the systems and methods herein could rely upon bounding polygons or other image segmentation methods instead of or in addition to the use of bounding boxes.

Each bounding box may be defined by a plurality of pixels within the image that are included in the bounding box. Accordingly, each bounding box may have an associated size. In some embodiments, each bounding box may include one or more possible classifications. For example, a bounding box may be classified as most likely a person, second most likely a tree, etc. Additionally or alternatively, a bounding box may be classified as 70% a person, 20% a vehicle, 5% sky, and 5% ground, or the like. In some embodiments, each classification may include a corresponding confidence score, e.g., classified as a vehicle with 80% confidence, classified as a lawnmower with 20% confidence, etc. Additionally or alternatively, each bounding box may include an overall confidence score, e.g., indicating a level of confidence regarding whether an object is included in the bounding box.

In some embodiments, the bounding boxes (and/or polygons and/or other image segmentations) may be defined by a matrix indicating locations of the bounding boxes (e.g., a center point, a top left point, a top right point, a bottom left point, a bottom right point, or the like), dimensions of the bounding boxes (e.g., height, width, or the like), one or more confidence scores, one or more classifications, or the like. For example, the matrix may be stored as a multi-dimensional array. Accordingly, any of the subset derivations, bounding box selections, and bounding box eliminations described herein may comprise a paring of the stored matrix (e.g., by deleting, zeroing out, or the like) of values not within a subset, non-selected values, or eliminated values, respectively.

The at least one processor may be configured to group the plurality of bounding boxes into a plurality of groups such that bounding boxes within a group have shared areas exceeding an area threshold. For example, if a first bounding box has a first area and at least a threshold amount of the first area is also included in a second area of a second bounding box, the first bounding box may be grouped with the second bounding box. In some embodiments, bounding boxes may belong to a plurality of groups. For example, if a first bounding box has a first area and at least a threshold amount of the first area is also included in a second area of a second bounding box, the first bounding box may be grouped with the second bounding box in a first group, and if a third bounding box has a third area and at least a threshold amount of the third area is also included in the second area of the second bounding box, the third bounding box may be grouped with the second bounding box in a second group. The threshold may comprise an absolute value (such as 10,000 pixels, 100,000 pixels, or the like) or may comprise a relative value (such as 50%, 60%, 70%, or the like).

The at least one processor may be further configured to derive a subset of first selected bounding boxes from the plurality of bounding boxes by selecting bounding boxes having the highest class confidence scores from various groups of bounding boxes (e.g., selecting the bounding box having the highest class confidence score from a group of bounding boxes in the image). It is to be noted that the term "first selected" is used merely to distinguish the subset of bounding boxes selected in this step from the bounding boxes initially detected (as described above) and the bounding boxes selected in optional subsequent steps (e.g., the "second selected" bounding box as described below). In certain embodiments, there is no further selection of a bounding box from the subset of first selected bounding boxes, so the "first selected" bounding box is also the final selected bounding box (i.e., the presence of a "first selected" bounding box does not mean that a "second selected" bounding box is required).

In some embodiments, the at least one processor may calculate a class confidence score for a bounding box based on a classification and a confidence associated with the bounding box. In such an example, if a bounding box has a 50% confidence and is 70% classified as a person, the at least one processor may combine the 50% and 70% (e.g., by multiplying 0.5 and 0.7, by adding 0.5 and 0.7, or the like) to calculate the class confidence score. Then the at least one processor may select the bounding box with the highest class confidence score within each group (i.e., first selected bounding box).

In embodiments where a bounding box includes a plurality of classifications, the at least one processor may use the classification having a highest score to calculate the class confidence score. Alternatively, the at least one processor may select the classification based on one or more desired classes, e.g., the at least one processor may always use a vehicle classification. In embodiments where the at least one processor uses a plurality of desired classes, the at least one processor may have a priority ranking of the desired classes, e.g., such that the at least one processor always uses a vehicle class if a bounding box has a vehicle classification but uses a railway car class if a bounding box does not have a vehicle classification.

The at least one processor may be configured to select a "second selected" bounding box from the subset of "first selected" bounding boxes, the second selected bounding box having a highest score based on area and class confidence score. It is to be noted that the term "second selected" is used merely to distinguish the subset of bounding boxes selected in this step from the bounding boxes initially detected (as described above) and the bounding boxes selected in prior steps (e.g., the selection of an "first selected" bounding box as described above). In certain embodiments, there are additional bounding box selection steps, so the "second selected" bounding box is not the final bounding box selected.

In certain embodiments, the at least one processor may add the area and the class confidence score of the bounding box, may multiple the area and the class confidence score of the bounding box, or the like. The at least one processor may select one or more second selected bounding box(es) by selecting the first selected bounding box(es) with the highest combined scores. Additionally or alternatively, the at least one processor may select one or more second selected bounding boxes having a combined score above a threshold. In such embodiments, the at least one processor may select no bounding boxes if all the combined scores are below the threshold and may select a plurality of first selected bounding boxes if multiple combined scores are above the threshold.

In some embodiments, the at least one processor may use a combination of the highest combined scores and a threshold for selecting the second selected bounding box. For example, the at least one processor may select all first selected bounding boxes having combined scores exceeding the threshold but may select the one first selected bounding box with the highest combined score if all the combined scores are below the threshold.

As understood by one of ordinary skill in the art, further selection of a third, fourth, fifth, etc. selected bounding box based on the prior subset of selected bounding boxes is contemplated in this disclosure. For example, a third subset of third selected bounding boxes may be selected from the subset of second selected bounding boxes, and so on. The selection of further subsets of selected bounding boxes may proceed according to the systems and methods disclosed herein.

For ease of use, the last selected bounding box(es) are deemed the "final selected bounding box(es)" in this section. As is apparent to one of ordinary skill in the art, any of the disclosed subsets of selected bounding box(es) may be considered the "final selected bounding box(es)," including the first selected bounding box(es) (e.g., if there are no further bounding box selection steps).

The at least one processor may be further configured to output the final selected bounding box(es). For example, the at least one processor may output an array indicating a location and dimensions of the final selected bounding box. In embodiments where the at least one processor selects a plurality of final bounding boxes (e.g., a plurality of second selected bounding boxes selected from the first subset in a system configured to select only two subsets of bounding boxes), the at least one processor may output a single array defining the plurality of final bounding boxes or may output a plurality of arrays, one for each final bounding box.

According to another aspect of present disclosure, as explained above, the at least one processor may be configured to receive an image. The received image may have dimensions, e.g., height and width. Accordingly, the image may be dimensioned as 400×300, 640×480, 800×600, 1024×768, 1600×1200, 2272×1704, or the like.

The at least one processor may be further configured to resize the image to match input dimensions of a model. For example, a YOLO architecture may have input dimensions of 224×224 or 448×448. Accordingly, an image with dimensions of 1024×768 may be scaled by (224/1024)×(224/768) or (448/1024)×(448/768). In another example, an SSD architecture may have input dimensions of 300×300. Accordingly, an image dimensions as 1600×1200 may be scaled by (300/1600)×(300/1200).

The at least one processor may be configured to use the model to detect a plurality of bounding boxes within the resized image. For example, as explained above, the model may comprise a YOLO architecture, an SSD architecture, or any other convolutional neural network.

The at least one processor may be further configured to derive a first subset of first selected bounding boxes from the plurality of bounding boxes by eliminating bounding boxes having a highest class confidence score below a first class confidence score threshold. For example, as explained above, the class confidence score for a bounding box may be based on a combination (e.g., by adding, multiplying, or the like) of a classification for the bounding and a confidence associated with the bounding box. Any bounding boxes having a class confidence score below a threshold may be eliminated. For example, the threshold may comprise 50%, 40%, 30%, or the like.

The at least one processor may be configured to derive a second subset from the first selected bounding boxes by eliminating first selected bounding boxes having a highest class confidence score not within a selected class. For example, if the selected class is a vehicle class, the at least one processor may eliminate a first selected bounding box if the highest (or only) class confidence score of the first selected bounding box is for a person, a tree, or any other class that is not the vehicle class. In embodiments where the selected class comprises a plurality of classes, a first selected bounding box may only be eliminated if the highest class confidence score is not within the plurality of classes. For example, if the selected classes are a person class and a tree class, the at least one processor may eliminate a first selected bounding box if the highest (or only) class confidence score of the first selected bounding box is for a vehicle, sky, ground, or any other class that is not the person class or the tree class.

The at least one processor may be configured to group the second selected bounding box(es) into a plurality of groups such that second selected bounding box(es) within a group have shared areas exceeding an area threshold. For example, as explained above, the threshold may comprise an absolute value (such as 10,000 pixels, 100,000 pixels, or the like) or may comprise a relative value (such as 50%, 60%, 70%, or the like).

As noted above, the at least one processor may be configured to derive a third subset of the second selected bounding boxes (that is, to create a third subset of third selected bounding boxes) by selecting second selected bounding boxes having highest class confidence scores from at least one group of second selected bounding boxes. The at least one processor may be further configured to pare the third subset by eliminating second selected bounding boxes that do not include a center point of the image. In some embodiments, the at least one processor may implement a buffer. For example, the at least one processor may eliminate second selected bounding boxes that do not include the center point of the image and do not include a point within the buffer (e.g., within 10 pixels, within 20 pixels, within 5% of a width or height of the image, within 10% of the width or height of the image, or the like).

Additionally with or alternatively to the center point, one or more points of interest may be used. For example, the at least one processor may eliminate second selected bounding boxes that do not include at least one point of interest and do not include a point within the buffer of at least one point of interest. Each point of interest may have the same buffer or a different associated buffer. For example, a first point of interest may have a 10 pixel buffer (or a 10% buffer) while a second point of interest may have a 20 pixel buffer (or a 5% buffer).

The at least one processor may be further configured to select a fourth selected bounding box from the pared third subset of third selected bounding boxes such that the fourth selected bounding box has a highest score based on area and class confidence score. As explained above, the combined score may be determined by adding area and class confidence score, multiplying area and class confidence score, or the like. As also explained above, the at least one processor may select one or more fourth selected bounding boxes by selecting the highest combined score, using a threshold, or a combination thereof.

Again, as noted above and as understood by one of ordinary skill in the art, further selection of a fifth, sixth, seventh, etc. selected bounding box based on the prior subset of selected bounding boxes is contemplated in this disclosure. For example, a fifth subset of fifth selected bounding boxes may be selected from the subset of fourth selected bounding boxes, and so on. The selection of further subsets of selected bounding boxes may proceed according to the systems and methods disclosed herein.

Again, for ease of use, the last selected bounding box(es) are deemed the "final selected bounding box(es)" for the purposes of this section. As is apparent to one of ordinary skill in the art, any of the disclosed subsets of selected bounding box(es) may be considered the "final selected bounding box(es)," including the first selected bounding box(es) (e.g., if there are no further bounding box selection steps).

The at least one processor may be further configured to scale the final selected bounding box based on the dimensions of the received image and the input dimensions. For example, if the image was scaled from 320×480 to 224×224 (e.g., for inputting to YOLO), the final selected bounding box may be scaled up according to (320/224)×(480/224). In another example, if the image was scaled from 480×320 to 300×300 (e.g., for inputting to SSD), the final selected bounding box may be scaled up according to (480/300)×(320/300). As explained above, the at least one processor may be configured to output the scaled final selected bounding box.

In any of the embodiments above, the at least one processor may be further configured to generated at least one cropped image based on the at least one final selected bounding box. For example, the at least one processor may be configured to overlay a final selected bounding box on the image and crop the image to the final selected bounding box. In some embodiments, the at least one processor may crop the image to include a buffer. For example, the buffer may comprise an absolute value, such as 10 pixels in a width direction, 10 pixels in a height direction, 100 pixels in a width direction, 100 pixels in a height direction, or the like. Alternatively, the buffer may comprise a relative value, such as 5% of the final selected bounding box size or the image size, 10% of the bounding box size or the image size, 20% of the final selected bounding box size or the image size, or the like. In embodiments where the at least one final selected bounding box comprises a plurality of bounding boxes, the at least one processor may iterative perform the cropping, as described above, with each iteration using the received image (that is, storing each cropped image and using the received image each time rather than a previously cropped version).

The at least one processor may be further configured to input the at least one cropped image to a second neural network to classify at least one object within the at least one final selected bounding box. The second neural network may be a convolutional neural network. Alternatively, the at least one processor may be further configured to input the at least one cropped image to a second neural network to generate features associated with the at least one final selected bounding box; and inputting the generated features into a third neural network to classify at least one object within the at least one final selected bounding box based on the associated features. The second neural network and/or the third neural network may be a convolutional neural network.

Embodiments of the present disclosure also relate to methods and computer-readable media that implement the above embodiments.

Reference will now be made in detail to exemplary embodiments and aspects of the present disclosure, examples of which are illustrated in the accompanying drawings.

FIG. 1 is a schematic representation of an example pipeline for object recognition on a preprocessed image. As depicted in FIG. 1, the pipeline may begin with an image 101. Image 101 may be processed by an algorithm (e.g., a YOLO architecture, an SSD architecture, or the like) to perform bounding box generation 103. The bounding boxes may then be used to perform cropping 105 on image 101. The cropped images may then be used in object recognition 107.

Figure 2A:
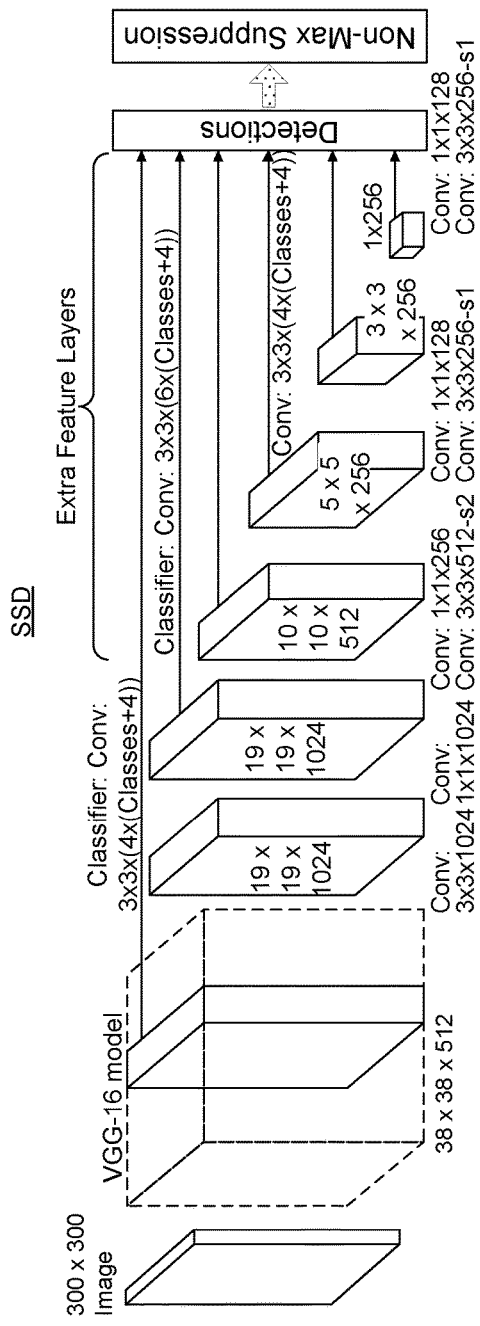
FIG. 2A is a schematic representation of an example bounding box algorithm, consistent with embodiments of the present disclosure.

FIG. 2A is a schematic representation of a YOLO architecture. For example, a YOLO architecture may have 24 convolutional layers followed by 2 fully connected layers. In some embodiments, a YOLO architecture may use 1×1 reduction layers followed by 3×3 convolutional layers. In another example, a fast YOLO architecture may have 9 convolutional layers rather than 24 convolutional layers and may use fewer filters per layer than a traditional YOLO architecture.

Figure 2B:
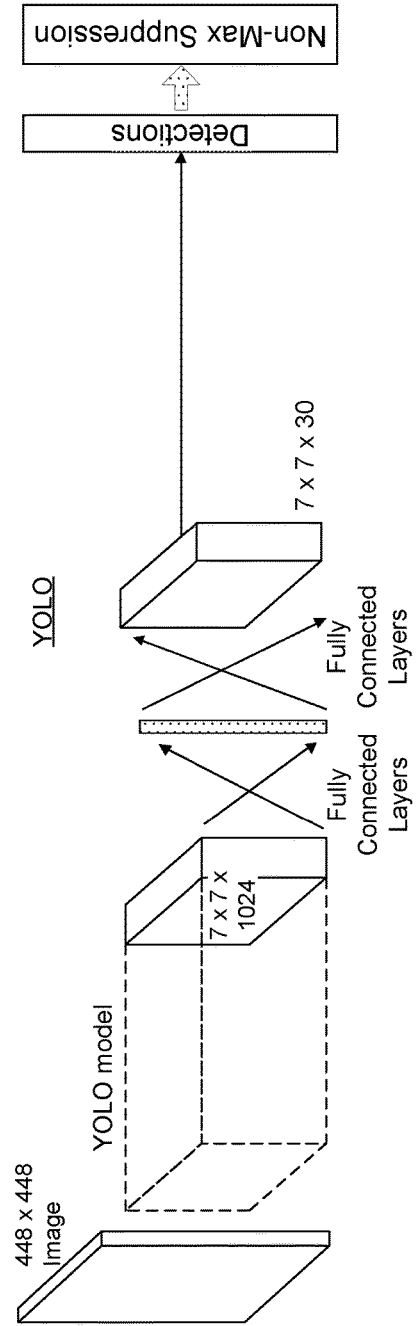
FIG. 2B is a schematic representation of another example bounding box algorithm, consistent with embodiments of the present disclosure.

FIG. 2B is a schematic representation of an SSD architecture. For example, an SSD architecture may use a VGG-16 base network (or other base network) followed by convolutional feature layers that progressive decrease in size.

As depicted in FIGS. 2A and 2B, non-maximum suppression may be used to reduce the bounding boxes output by a YOLO architecture, an SSD architecture, or the like. However, non-maximum suppression is generally insufficient to allow for accurate object recognition in multiple-object images.

Figure 3:
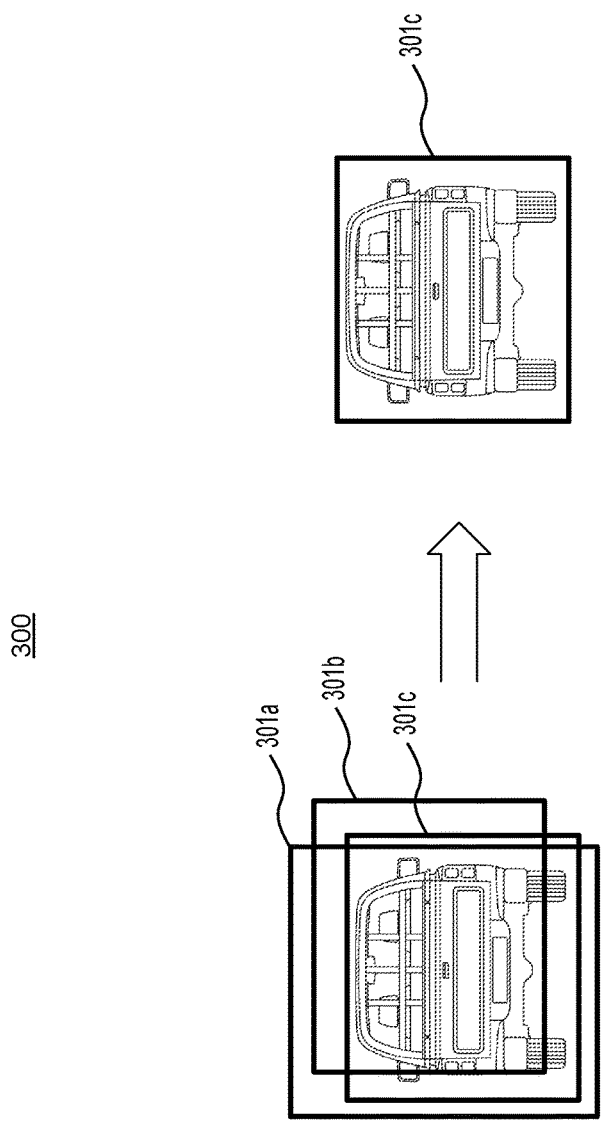
FIG. 3 is a schematic representation of eliminating bounding boxes with overlapping areas, consistent with embodiments of the present disclosure.

FIG. 3 is a schematic representation of an example 300 of eliminating bounding boxes with overlapping areas. A bounding box model (such as a YOLO architecture, an SSD architecture, or the like) may generate a plurality of bounding boxes (e.g., on the order of 1000 boxes, on the order of 10,000 boxes, or the like). For example, as depicted in FIG. 3, the bounding box model may generate bounding boxes 301a, 301b, and 301c. Boxes 301a, 301b, and 301c may overlap. Accordingly, the overlapping boxes may be pared down such that a single object only has a few bounding boxes or even one bounding box, e.g., box 301c. Such paring may be accomplished using non-maximum suppression, methods disclosed herein, or a combination thereof.

Figure 4:
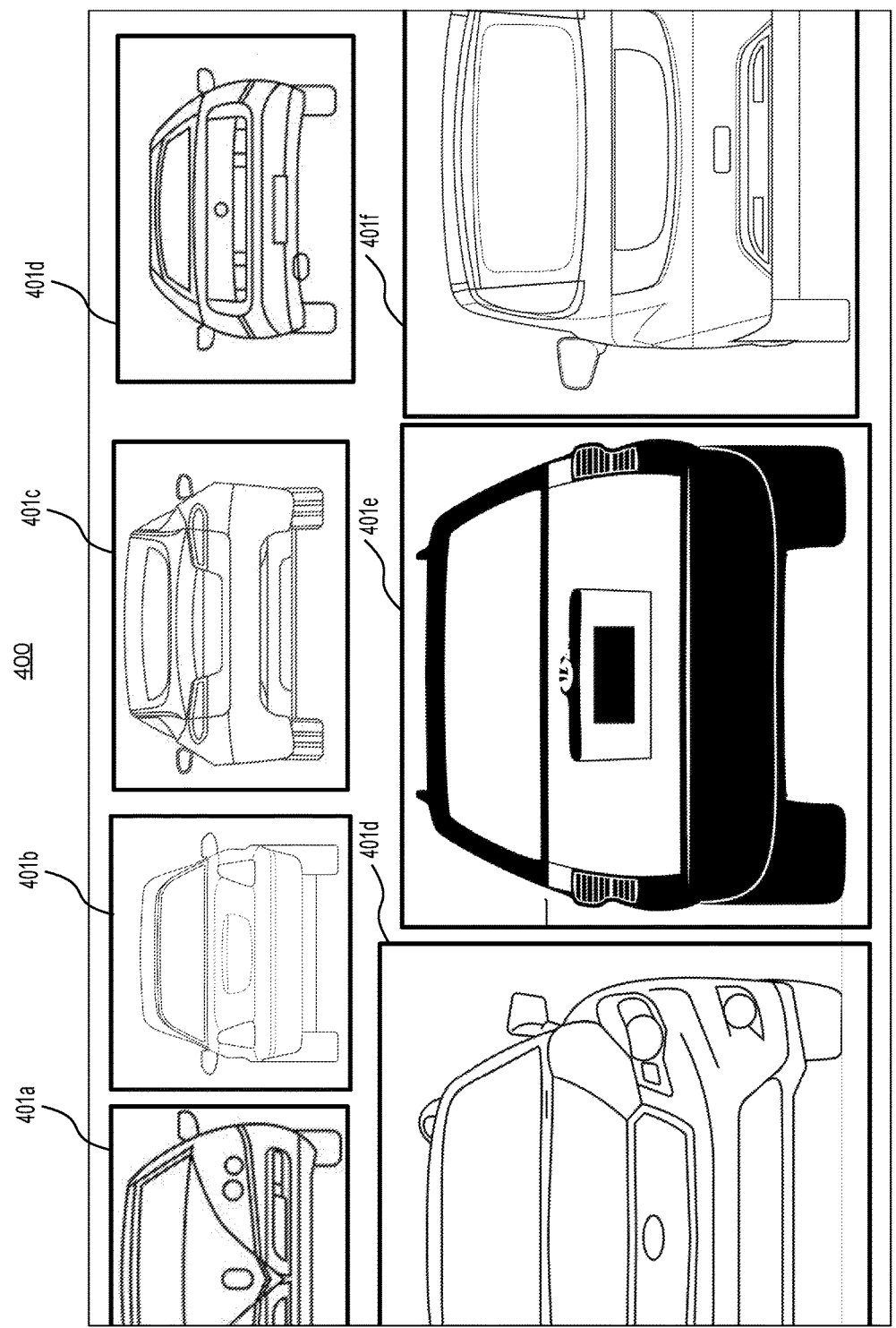
FIG. 4 is a schematic representation of selecting a centered bounding box, consistent with embodiments of the present disclosure.

FIG. 4 is a schematic representation of an example 400 of selecting a centered bounding box. A bounding box model (such as a YOLO architecture, an SSD architecture, or the like) may generate a plurality of bounding boxes (e.g., on the order of 1000 boxes, on the order of 10,000 boxes, or the like). For example, as depicted in FIG. 4, the bounding box model may generate bounding boxes 401a, 401b, 401c, 401d, 401e, and 401f. Boxes 401a, 401b, 401c, 401d, 401e, and 401f may be spread amongst the foreground and background and/or may vary between being fully captured and being cut off by the limits of the image. Accordingly, only boxes that are centered (e.g., including the center point or being within a buffer of the center point) and/or have a sufficient area and confidence (e.g., combined in a composite score) may be selected. For example, box 401e may be selected. Such selection may be accomplished using methods disclosed herein.

Figure 5:
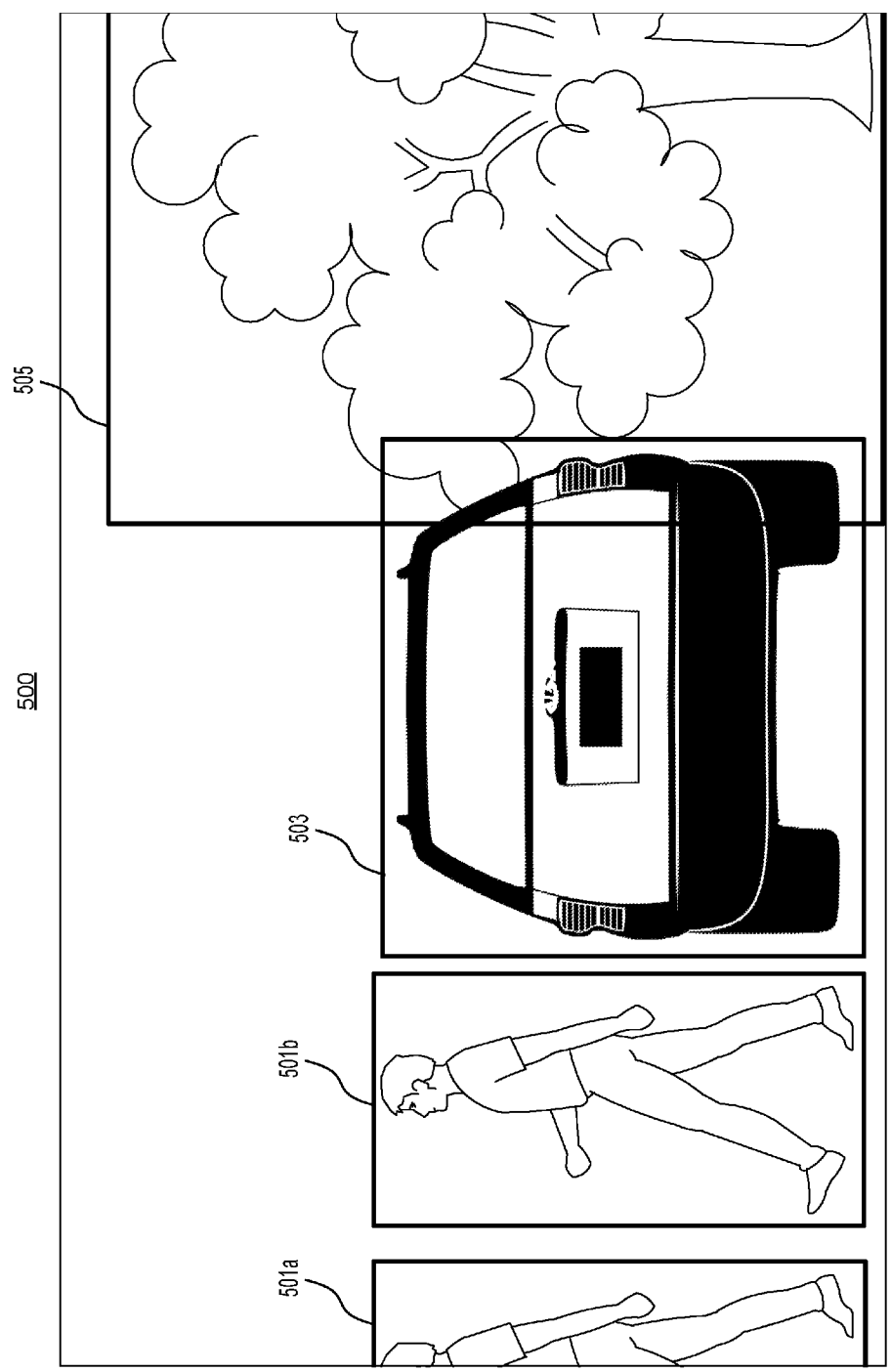
FIG. 5 is a schematic representation of selecting bounding boxes by class confidence scores, consistent with embodiments of the present disclosure.

FIG. 5 is schematic representation of an example 500 of selecting bounding boxes by class confidence scores. A bounding box model (such as a YOLO architecture, an SSD architecture, or the like) may generate a plurality of bounding boxes (e.g., on the order of 1000 boxes, on the order of 10,000 boxes, or the like). For example, as depicted in FIG. 4, the bounding box model may generate bounding boxes 501a and 501b for persons, box 503 for a vehicle, and box 505 for a tree. Accordingly, only boxes that are centered (e.g., including the center point or being within a buffer of the center point) and/or have a sufficient area and confidence (e.g., combined in a composite score) in one or more desired classes may be selected. For example, if "person" is the desired class, box 501b may be selected. Such selection may be accomplished using methods disclosed herein.

Figure 6:
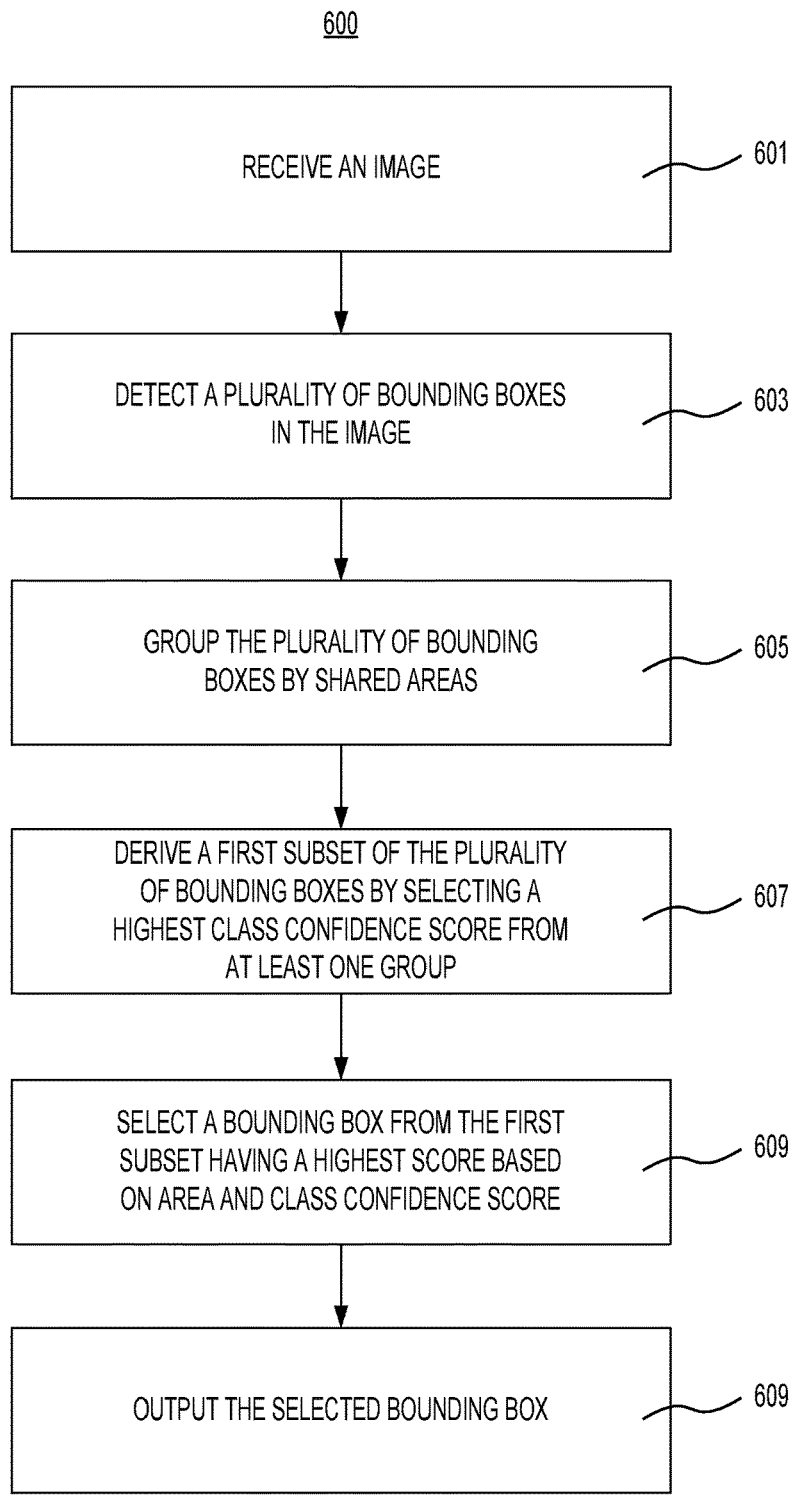
FIG. 6 is a flowchart of an exemplary method for preprocessing an image for object recognition, consistent with embodiments of the present disclosure.

FIG. 6 is a flowchart of exemplary method 600 for preprocessing an image for object recognition. Exemplary method 600 may be implemented by, for example, at least one processor. Exemplary method 600 may further be implemented using a special-purpose computer, e.g., constructed using one or more ASICs, FPGAs, or the like.

At step 601, the processor may receive an image. For example, the processor may use a bus for receiving the image from the at least one memory. Additionally or alternatively, the processor may use an image sensor for capturing the image and a bus for receiving the image from the image sensor. Additionally or alternatively, the processor may use a network interface controller for receiving the image over a computer network. In some embodiments, the processor may further resize the image to match input dimensions of a model. Additionally or alternatively, the processor may further adjust the received image based on an angle of capture of the image.

At step 603, the processor may detect a plurality of bounding boxes within the image. For example, as explained above, the processor may use a YOLO architecture, an SSD architecture, or the like to detect the plurality of bounding boxes. In embodiments where the processor resizes the image, the model may comprise the algorithm used.

At step 605, the processor may group the plurality of bounding boxes into a plurality of groups. Bounding boxes within a group may have shared areas exceeding an area threshold. For example, as explained above, the threshold may comprise an absolute value (such as 10,000 pixels, 100,000 pixels, or the like) or may comprise a relative value (such as 50%, 60%, 70%, or the like).

At step 607, the processor may derive a first subset of the plurality of bounding boxes by selecting a bounding box having a highest class confidence score from at least one group. For example, as explained above, the class confidence score for a bounding box may be calculated as a combination (e.g., an addition, multiplication, or the like) of a classification for the bounding box and a confidence associated with the bounding box.

In some embodiments, the processor may derive a second subset of the plurality of bounding boxes by eliminating bounding boxes having one or more class confidence scores below a first class confidence score threshold. For example, as explained above, each bounding box may have a plurality of class confidence scores, and the second subset may be derived by eliminating bounding boxes for which each class confidence score is below the first class confidence score threshold. Additionally or alternatively, deriving a second subset of the plurality of bounding boxes may be performed by eliminating bounding boxes having a highest class confidence score not within a selected class. Accordingly, the first subset may be derived from the second subset.

Additionally or alternatively, the processor may further pare the first subset by eliminating bounding boxes that do not include a center point of the image. As explained above, the processor may implement a buffer to pare the first subset by eliminating bounding boxes that do not include the center point and do not include a pixel within the buffer of the center point. As explained above, additionally with or alternatively to the center point, one or more points of interest may be used.

At step 609, the processor may select a bounding box from the first subset having a highest score based on area and class confidence score. For example, as explained above, the combined score may be determined by adding area and class confidence score, multiplying area and class confidence score, or the like. As also explained above, the at least one processor may select one or more bounding boxes by selecting the highest combined score, using a threshold, or a combination thereof. In embodiments where the processor further pares the first subset, the selected bounding box may be selected from the pared first subset.

At step 611, the processor may output the selected bounding box. Additionally or alternatively, the processor may crop the image based on the selected bounding box. In some embodiments, cropping the image may comprise cropping the image to include pixels enclosed by the selected bounding box and pixels located within a threshold of the selected bounding box. For example, the threshold may comprise 10% of a corresponding dimension of the bounding box.

Figure 7:
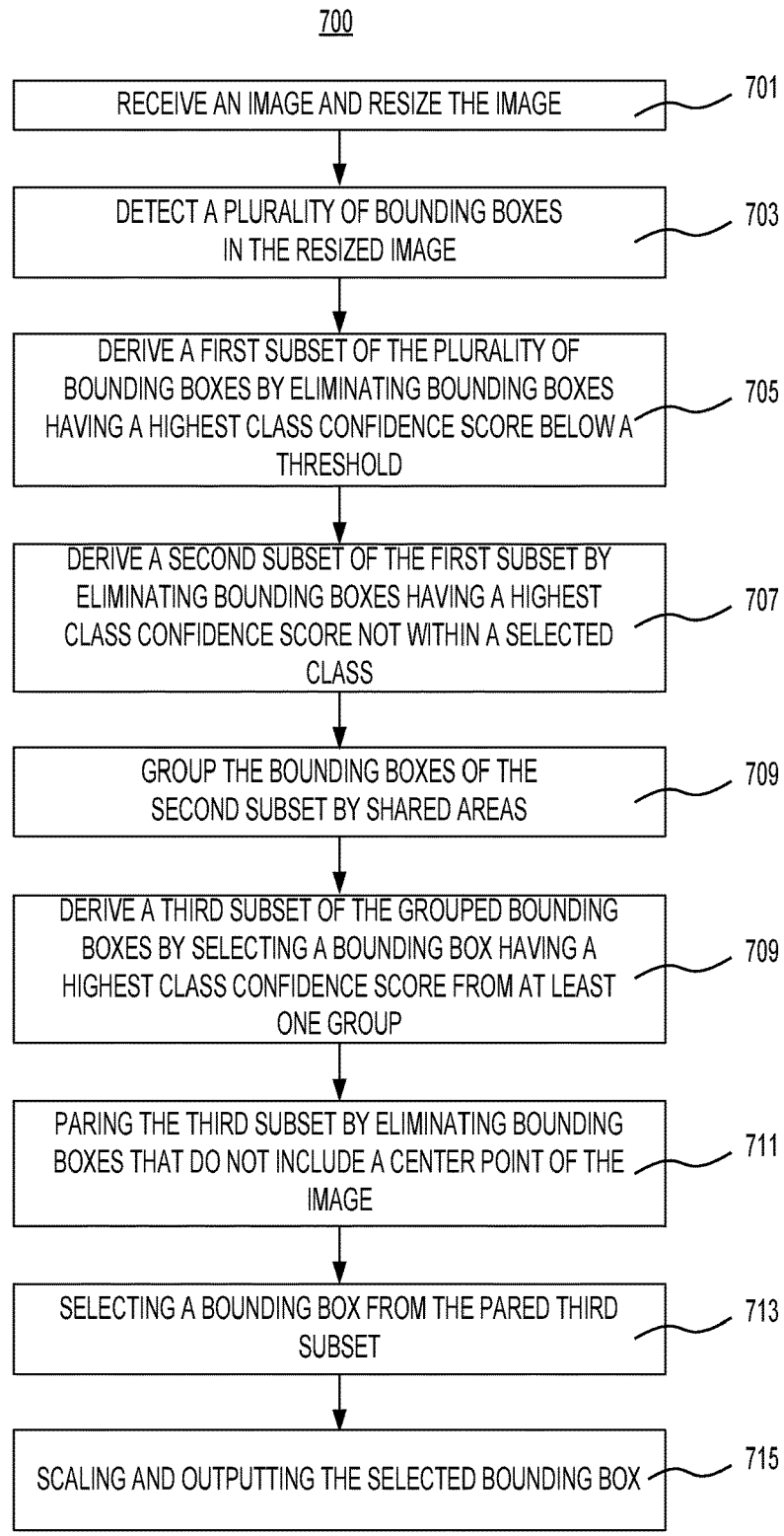
FIG. 7 is a flowchart of another exemplary method for preprocessing an image for object recognition, consistent with embodiments of the present disclosure.

In any of the embodiments above, the cropped image may be input to an object recognition algorithm. For example, the object recognition algorithm may comprise a convolutional neural network FIG. 7 is a flowchart of exemplary method 700 for preprocessing an image for object recognition. Exemplary method 700 may be implemented by, for example, at least one processor. Exemplary method 700 may further be implemented using a special-purpose computer, e.g., constructed using one or more ASICs, FPGAs, or the like.

At step 701, the processor may receive an image having certain dimensions and resize the image to match the input dimensions of a model. For example, the model may comprise a YOLO architecture, an SSD architecture, or the like. In some embodiments, the processor may use a bus for receiving the image from the at least one memory. Additionally or alternatively, the processor may use an image sensor for capturing the image and a bus for receiving the image from the image sensor. Additionally or alternatively, the processor may use a network interface controller for receiving the image over a computer network. In some embodiments, the processor may further adjust the received image based on an angle of capture of the image.

At step 703, using the model, the processor may detect a plurality of bounding boxes within the resized image. For example, as explained above, the plurality of bounding boxes may be defined by a matrix.

At step 705, the processor may derive a first subset of the plurality of bounding boxes by eliminating bounding boxes having a highest class confidence score below a first class confidence score threshold. For example, as explained above, the class confidence score for a bounding box may be based on a combination (e.g., by adding, multiplying, or the like) a classification for the bounding and a confidence associated with the bounding box. Any bounding boxes having a class confidence score below a threshold may be eliminated. For example, the threshold may comprise 50%, 40%, 30%, or the like.

At step 707, the processor may derive a second subset of the first subset by eliminating bounding boxes having a highest class confidence score not within a selected class. For example, as explained below with respect to method 800, the selected class may be determined by user input or be predetermined.

At step 709, the processor may group the bounding boxes of the second subset into a plurality of groups. Bounding boxes within a group may have shared areas exceeding an area threshold. For example, the area threshold may comprise 50%, 60%, 70%, or the like.

At step 711, the processor may derive a third subset of the grouped bounding boxes by selecting a bounding box having a highest class confidence score from at least one group. For example, as explained above, the processor may select the bounding box with the highest class confidence score, select bounding boxes from the groups based on a class confidence score threshold, or use a combination thereof.

At step 713, the processor may pare the third subset by eliminating bounding boxes that do not include a center point of the image. As explained above, the processor may additionally use a buffer. As also explained above, the processor may use, in addition to the center point or in lieu of the center point, one or more points of interest.

At step 715, the processor may select a bounding box from the pared third subset, the selected bounding box having a highest score based on area and class confidence score. For example, as explained above, the processor may combine (e.g., using addition, multiplication, or the like) the area and the class confidence score.

At step 717, the processor may scale the selected bounding box based on the dimensions of the received image and the input dimensions and output the scaled bounding box. As explained above, the processor may additionally or alternatively crop the image based on the selected bounding box. In some embodiments, cropping the image may comprise cropping the image to include pixels enclosed by the selected bounding box and pixels located within a threshold of the selected bounding box. For example, the threshold may comprise 10% of a corresponding dimension of the bounding box.

Figure 8:
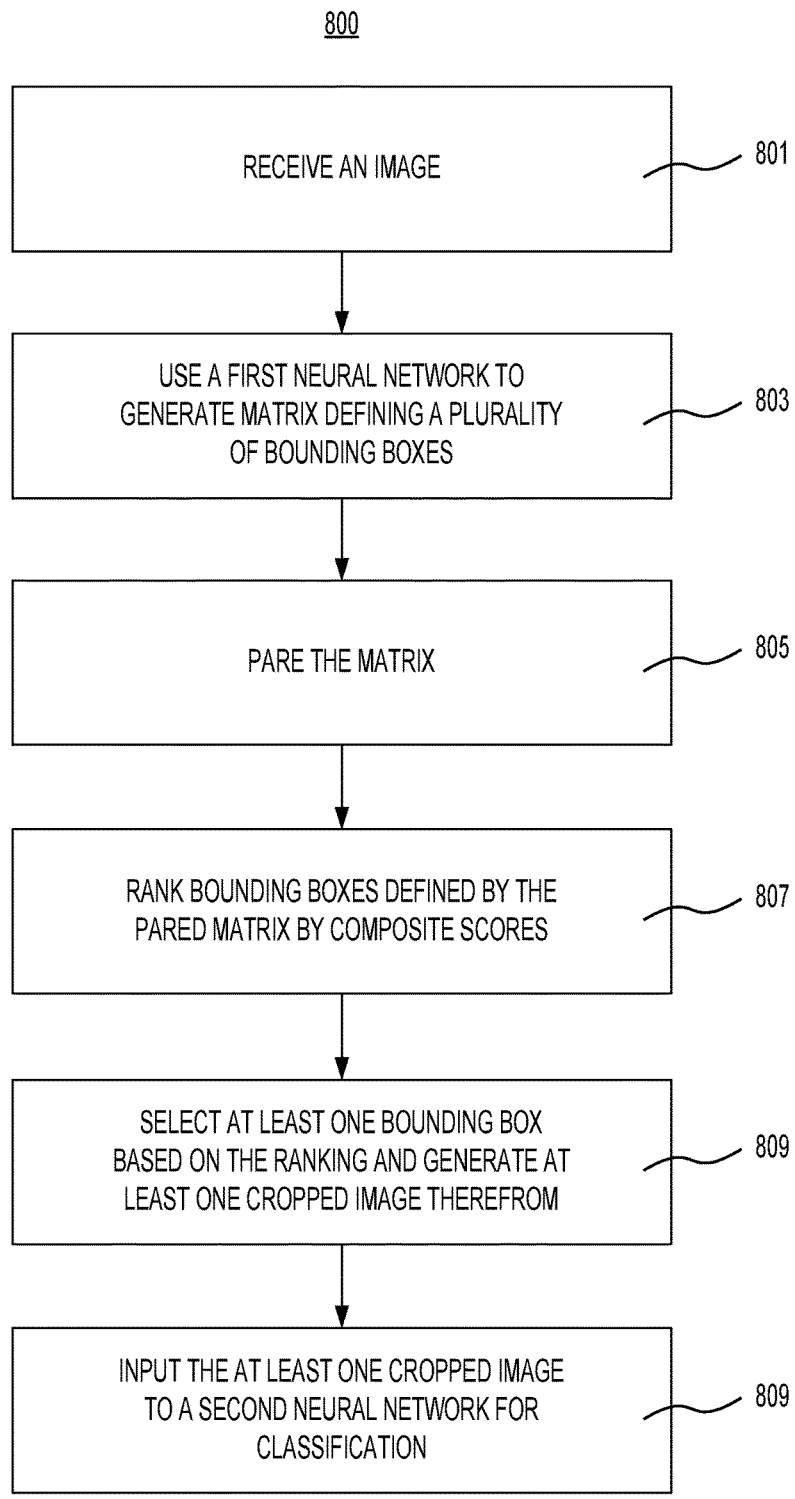
FIG. 8 is a flowchart of an exemplary method for object recognition on a preprocessed image, consistent with embodiments of the present disclosure.

In any of the embodiments above, the cropped image may be input to an object recognition algorithm. For example, the object recognition algorithm may comprise a convolutional neural network FIG. 8 is a flowchart of exemplary method 800 for preprocessing an image for object recognition. Exemplary method 800 may be implemented by, for example, at least one processor. Exemplary method 800 may further be implemented using a special-purpose computer, e.g., constructed using one or more ASICs, FPGAs, or the like.

At step 801, the processor may receive an image. For example, the processor may use a bus for receiving the image from the at least one memory. Additionally or alternatively, the processor may use an image sensor for capturing the image and a bus for receiving the image from the image sensor. Additionally or alternatively, the processor may use a network interface controller for receiving the image over a computer network. In some embodiments, the processor may further resize the image to match input dimensions of a model.

In some embodiments, the processor may further resize the image to match input dimensions of a first neural network. Additionally or alternatively, the processor may further adjust the received image based on an angle of capture of the image.

At step 803, using the first neural network, the processor may generate a matrix defining a plurality of bounding boxes within the image. For example, as explained above, the processor may use a YOLO algorithm, an SSD algorithm, or the like to generate the matrix. Accordingly, in some embodiments, the first neural network may comprise a convolutional neural network. The bounding boxes having associated areas and associated class confidence scores. For example, as explained above, the class confidence score for a bounding box may be calculated as a combination (e.g., an addition, multiplication, or the like) of a classification associated with the bounding box and a confidence associated with the bounding box.

At step 805, the processor may pare the matrix. In one example, the processor may pare the matrix by using non-maximum suppression. Additionally or alternatively, the processor may pare the matrix by eliminating bounding boxes having highest associated confidence scores not within one or more selected classes. The one or more selected classes may be selected based on user input. For example, a user may input an indication that vehicles should be selected, that persons and trees should be selected, or the like. Alternatively, the one or more selected classes may be predetermined, e.g., based on one or more classes for which object recognition is to be performed.

In some embodiments, the processor may further pare the matrix by selecting one bounding box of a plurality of bounding boxes having a shared area. The selection may be performed only when the shared area exceeds a threshold. For example, the threshold may comprise 70% of an area of the corresponding box.

In some embodiments, each bounding box may have an associated confidence score and a plurality of associated class scores, and the operations further comprise determining associated class confidence scores for each bounding box based on the associated confidence score and the plurality of associated class scores. Accordingly, each bounding box may have a plurality of associated class confidence scores. In such embodiments, the associated class confidence scores are computed by multiplying the associated confidence score by each associated class score.

In some embodiments, the processor may derive a subset of the bounding boxes defined by the pared matrix by eliminating bounding boxes having a highest class confidence score not within one or more selected classes. In such embodiments, the derived subset of bounding boxes may be ranked in step 807, described below.

At step 807, the processor may rank bounding boxes defined by the pared matrix by composite scores based on associated areas and highest associated class confidence scores. For example, as explained above, the composite scores may be computed by multiplying the associated areas and the highest associated confidence scores. In other embodiments, the composite scores may be computed by adding the associated areas and the highest associated confidence scores. Other mathematical operations may be used. As also explained above, the at least one processor may select one or more bounding boxes by selecting the highest composite score, using a threshold, or a combination thereof.

At step 809, the processor may select at least one bounding box based on the ranking and generate at least one cropped image based on the at least one selected bounding box.

At step 811, the processor may input the at least one cropped image to a second neural network to classify at least one object within the at least one selected bounding box. For example, the second neural network may comprise a convolutional neural network.

In some embodiments, the at least one bounding box may comprise a plurality of bounding boxes, and the at least one cropped image may comprise a plurality of cropped images. In such embodiments, generating the plurality of cropped images may comprise, for each bounding box, overlaying the bounding box on the image, generating a corresponding cropped image by cropping the image to include pixels enclosed by the overlaid bounding box and pixels located within a threshold of the overlaid bounding box, and storing the generated cropped image. The image may be reset to non-cropped before each overlaying.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented with hardware alone. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

Instructions or operational steps stored by a computer-readable medium may be in the form of computer programs, program modules, or codes. As described herein, computer programs, program modules, and code based on the written description of this specification, such as those used by the controller, are readily within the purview of a software developer. The computer programs, program modules, or code can be created using a variety of programming techniques. For example, they can be designed in or by means of Java, C, C++, assembly language, or any such programming languages. One or more of such programs, modules, or code can be integrated into a device system or existing communications software. The programs, modules, or code can also be implemented or replicated as firmware or circuit logic.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A system for preprocessing an image for object recognition, the system comprising:
   at least one memory storing instructions; and
   at least one processor configured to execute the instructions to perform operations comprising:
      receiving the image,
      detecting a plurality of bounding boxes within the image,
      grouping the plurality of bounding boxes into a plurality of groups, wherein bounding boxes within a group have shared areas exceeding an area threshold,
      deriving a first subset of the plurality of bounding boxes by selecting bounding boxes having a highest class confidence scores from at least one group,
      selecting a bounding box from the first subset having a highest score based on area and class confidence score, and
      outputting the selected bounding box.

2. The system of claim 1, wherein the operations further comprise paring the first subset by eliminating bounding boxes that do not include a center point of the image.

3. The system of claim 2, wherein the selected bounding box is selected from the pared first subset.

4. The system of claim 1, wherein the operations further comprise deriving a second subset of the plurality of bounding boxes by eliminating bounding boxes having one or more class confidence scores below a first class confidence score threshold.

5. The system of claim 4, wherein each bounding box has a plurality of class confidence scores, and the second subset is derived by eliminating bounding boxes for which each class confidence score is below the first class confidence score threshold.

6. The system of claim 4, wherein the first subset is derived from the second subset.

7. The system of claim 1, wherein the operations further comprise deriving a second subset of the plurality of bounding boxes by eliminating bounding boxes having a highest class confidence score not within a selected class.

8. The system of claim 1, wherein the operations further comprise cropping the image based on the selected bounding box.

9. The system of claim 8, wherein cropping the image comprises cropping the image to include pixels enclosed by the selected bounding box and pixels located within a threshold of the selected bounding box.

10. The system of claim 9, wherein the threshold comprises 10% of a corresponding dimension of the bounding box.

11. A system for preprocessing an image for object recognition, the system comprising:
- at least one memory storing instructions; and
- at least one processor configured to execute the instructions to perform operations comprising:
  - receiving the image having dimensions,
  - resizing the image to match input dimensions of a model,
  - using the model, detecting a plurality of bounding boxes within the resized image,
  - grouping the plurality of bounding boxes into a plurality of groups, wherein bounding boxes within a group have shared areas exceeding an area threshold,
  - deriving a first subset of the plurality of bounding boxes by selecting bounding boxes having a highest class confidence scores from at least one group,
  - selecting a bounding box from the first subset having a highest score based on area and class confidence score,
  - scaling the selected bounding box based on the dimensions of the received image and the input dimensions, and
  - outputting the scaled bounding box.

12. The system of claim 11, further comprising a bus for receiving the image from the at least one memory.

13. The system of claim 11, further comprising an image sensor for capturing the image and a bus for receiving the image from the image sensor.

14. The system of claim 11, further comprising a network interface controller for receiving the image over a computer network.

15. The system of claim 11, wherein the operations further comprise cropping the image based on the scaled bounding box.

16. The system of claim 15, wherein cropping the image comprises overlaying the scaled bounding box on the image and cropping the image to include pixels enclosed by the overlaid bounding box and pixels located within a threshold of the overlaid bounding box.

17. The system of claim 16, wherein the threshold comprises 10% of a corresponding dimension of the bounding box.

18. The system of claim 15, wherein the cropped image is input to an object recognition algorithm.

19. The system of claim 18, wherein the object recognition algorithm comprises a convolutional neural network.

20. A system for preprocessing an image for object recognition, the system comprising:
- at least one memory storing instructions; and
- at least one processor configured to execute the instructions to perform operations comprising:
  - receiving the image having dimensions,
  - resizing the image to match input dimensions of a model,
  - using the model, detecting a plurality of bounding boxes within the resized image,
  - deriving a first subset of the plurality of bounding boxes by eliminating bounding boxes having a highest class confidence score below a first class confidence score threshold,
  - deriving a second subset of the first subset by eliminating bounding boxes having a highest class confidence score not within a selected class,
  - grouping the bounding boxes of the second subset into a plurality of groups, wherein bounding boxes within a group have shared areas exceeding an area threshold,
  - deriving a third subset of the grouped bounding boxes by selecting a bounding box having a highest class confidence score from at least one group,
  - paring the third subset by eliminating bounding boxes that do not include a center point of the image,
  - selecting a bounding box from the pared third subset, the selected bounding box having a highest score based on area and class confidence score,
  - scaling the selected bounding box based on the dimensions of the received image and the input dimensions, and
  - outputting the scaled bounding box.

* * * * *